F. Bauschtliter,
Fire Plug.
No. 108,751.      Patented Nov. 1, 1870.
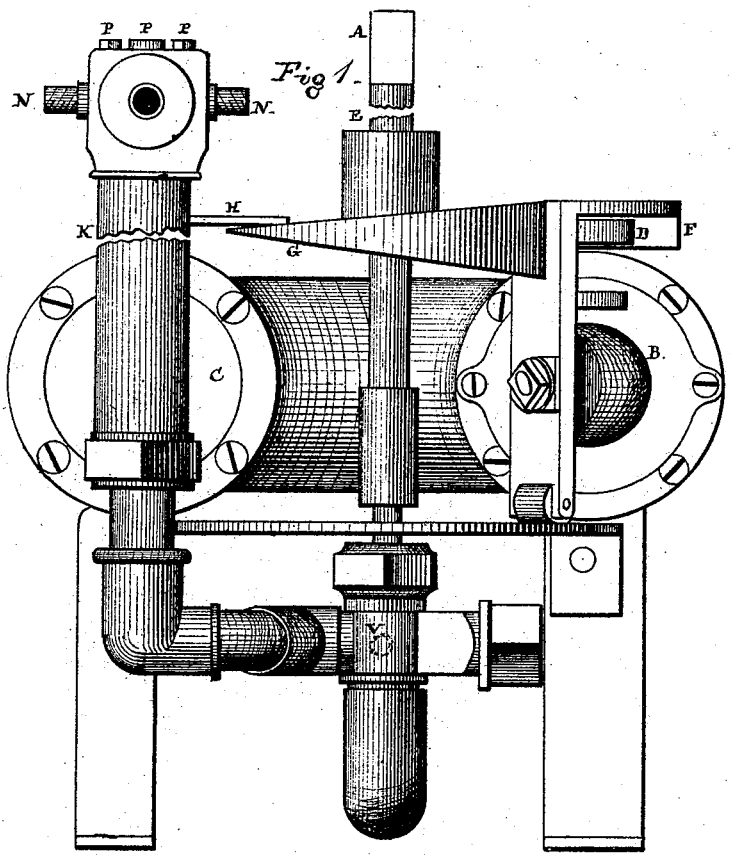
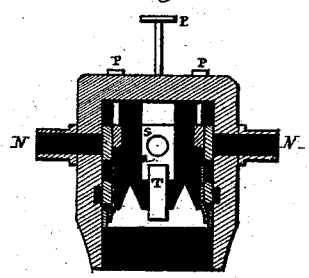
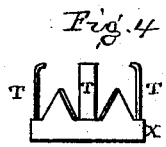
Witnesses.                    Inventor.

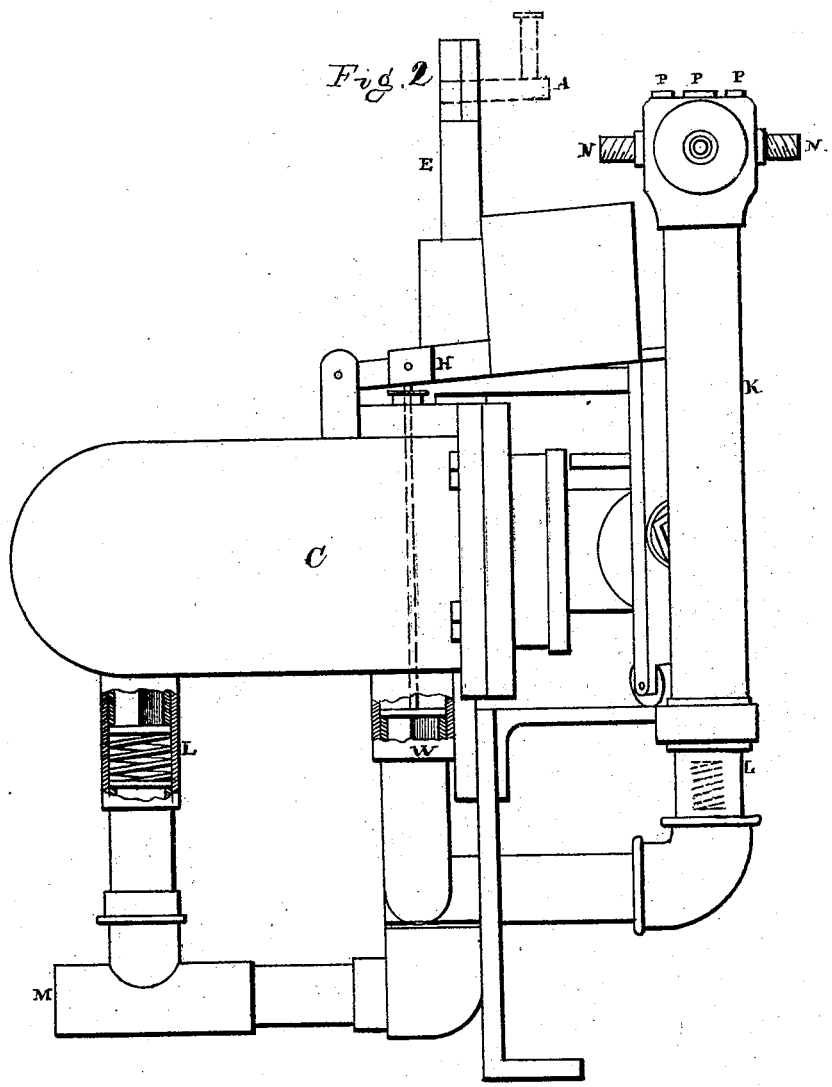

United States Patent Office.

FREDERICK BAUSCHTLIKER, OF WASHINGTON, DISTRICT OF COLUMBIA, ASSIGNOR TO HIMSELF AND FREDERICK GENTNER, OF PHILADELPHIA, PENNSYLVANIA.

Letters Patent No. 108,751, dated November 1, 1870.

IMPROVEMENT IN COMBINED HYDRANTS AND FIRE-PLUGS.

The Schedule referred to in these Letters Patent and making part of the same.

*To all whom it may concern:*

Be it known that I, FREDERICK BAUSCHTLIKER, of the city of Washington and District of Columbia, have invented an "improved Hydrant and Fire-Plug Combined;" and I do hereby declare the following to be an exact description thereof, reference being had to the accompanying drawings and to the letters of reference marked thereon making a part of this specification, in which—

Figure 1 represents a front elevation of the hydrant and fire-plug combined.

Figure 2 shows a side elevation of the same.

Figure 3, a sectional view of the fire-plug, showing one or four discharge-pipes with their cut-offs.

Figure 4 shows the flat springs that prevent any waste of water when the hydrant is closed, and operate as valves to let on or shut off the flow of the water.

The nature of my invention consists in the construction and arrangement of the devices for discharging the water as a fire-plug in and through one or more pipes or openings, in combination with the cylindrical hydrant or plunger, arranged with a receiving and discharge-pipe, and receiving and discharge-valves, so as to turn the water on or off, and, when turned off, the water is forced back into the main pipe beneath, so as to prevent its freezing in the winter.

The object of my invention is to have one single flow of water as a hydrant for ordinary use, or four flows or discharge-pipes to supply one or four attachments of hose in case of fire, so as to secure an abundance of water, at the same time to be shut off and prevent the water from being frozen in the plugs, as usual.

A represents the main lever at the top of the vertical shaft E, by which the pipes are opened or closed as the inside plunger or circular piston B is moved backward or forward in the cylinder C.

The angular arm D, attached to the revolving upright shaft E, operates upon the revolving frame or wheel F, and moves the plunger B backward and forward, corresponding with the revolution of the shaft E.

An arm, G, projecting also from the frame F, moves under the lever H, raising it, and thus frees the valve W in the lower side and front of the cylinder C, and allows the water to pass from the discharge-pipe K, and, as the lever A is reversed, the weighted lever H again falls upon the stem of the valve W, shutting off the flow of water from the discharge-pipe, while the movement of the piston B opens the valve L as it passes over it, and forces the water down into the supply-pipe M, and retaining it there so as to prevent the water from freezing.

At the top of the discharge-pipe K are four openings, N, one on each side.

These openings are regulated by four upright keys, P, that have flat ends R, that cover the discharge-apertures S, so that in raising one key P, a single flow of water is obtained that answers as an ordinary hydrant for common house purposes, but by raising two or four keys P, the flow of water is increased in sufficient quantities to supply two, three, or four attachments of hose as a complete fire-plug.

These lower ends of the keys are held tightly against the pipe K by flat springs T, so as to prevent any waste of water when the hydrant is closed, and operate as valves to let on or shut off the flow of the water.

The springs T are attached to a ring, X, and they fall back upon the incline planes Z, and forward again to shut off the flow.

When the lever A is turned full to the left the water enters the hydrant and fire-plug at the supply-pipe M, and the rear valve L is closed, the water passing through an aperture V in the upright shaft E at the center pipe, and up through the discharge-pipe or fire-plug K, at one or more of the openings N at top, and is then in running order.

By turning the lever A partly to the right the aperture V in the center box is closed. Then the water flows from the discharge-pipe or fire-plug K down to the pipe W on the right, and is forced up into the circular cylinder C above, and, as the shaft E is still being turned by the lever A, the inside circular piston B is moved forward and the water passes down through the rear pipe and valve L into the supply-pipe M.

What I claim as my invention, and desire to secure by Letters Patent, is—

The arrangement and combination of the cylindrical hydrant and fire-plug with their cylinders B and C, discharge-openings N, keys P, R, S, and T, operating as herein described and for the purposes set forth.

FREDERICK BAUSCHTLIKER.

Witnesses:
J. FRANKLIN REIGART,
T. B. W. SIEGERT.